Jan. 13, 1970  H. J. R. MAGET  3,489,670
PROCESS FOR GAS PURIFICATION
Filed July 29, 1964

INVENTOR
HENRI J.R. MAGET
BY,
Paul A. Frank
ATTORNEY

United States Patent Office 3,489,670
Patented Jan. 13, 1970

3,489,670
PROCESS FOR GAS PURIFICATION
Henri J. R. Maget, Swampscott, Mass., assignor to General Electric Company, a corporation of New York
Filed July 29, 1964, Ser. No. 385,925
Int. Cl. C01b 13/04
U.S. Cl. 204—129                      7 Claims

ABSTRACT OF THE DISCLOSURE

Hydrogen or oxygen is supplied to one fuel cell electrode mixed with other gases or in chemical combination with other elements. A potential difference is induced between the one electrode and a counter electrode of the fuel cell separated by a polymeric ion exchange electrolyte to generate pure hydrogen or oxygen at the counter electrode. The hydrogen or oxygen may be generated by decomposition of water or may be transported through the electrolyte in ionic form, depending upon whether a polymeric cation or anion exchange electrolyte is employed.

---

This invention relates to methods and apparatus for use in the treatment of gases. More particularly, it relates to processes and apparatus useful in gas treatment involving electrical and chemical operations on the gas being treated.

Various schemes have been proposed in the past for the purification of hydrogen. These schemes may be classified generically as follows: absorption systems, catalytic reaction techniques, cryogenic processing, adsorption techniques, and diffusion. Among the absorption systems are copper liquor scrubbing, amine absorption, potassium carbonate absorption, caustic soda scrubbing, and water scrubbing. Catalytic reaction techniques have involved the water gas shift reaction and methanation. Cryogenic processing involves the freezing out of impurities contained in the hydrogen by utilizing liquid nitrogen. Molecular sieves and activated carbon are used to adsorb impurities from impure hydrogen. One of the systems utilized in diffusion is diffusion through palladium membrane.

Each of these systems is subject to limitations. First, with the exception of the palladium, more than one pass is generally necessary to produce high purity hydrogen, that is a gas containing at least 99.5% hydrogen. Further purification is possible, but only through additional treatments. Each of the processes is expensive, involving non-reusable material, high initial investment cost, or the necessity of subsequent treatments. Further, using either the absorption or adsorption techniques, only particular impurities may be removed, unless a number of treatment steps and agents are employed.

With the palladium diffusion system several problems are encountered. One is the poisoning of the palladium which cuts the diffusion rate. This is caused by the adsorption on the palladium surface of unsaturated hydrocarbons. These hydrocarbons can be burned off only by heating the unit in air. In addition, materials such as halides and sulfides react with palladium to form water-soluble halides and sulfides which cause loss of the palladium membrane material and, thus, cracks in the diffusion surface. Pin holes or cracks in palladium diffusion membranes may also be caused by excessive pressure or abuse. These openings allow impurities to pass through the membrane along with the hydrogen. Additionally, a high pressure input, and a low pressure output, are necessary utilizing palladium diffusion.

These difficulties have been overcome and a more versatile system capable not only of purifying hydrogen, but other gases as well, by the use of the process of the present invention. Utilizing ionic materials, such as polymeric ion exchange membranes which have permselective properties, and aqueous solutions of inorganic materials which form electrolytes, the rate of separation and the efficiency of the process may be increased by dissociating a gas to be treated and allowing the gas to migrate in ionic, rather than in molecular, form.

The use of fuel cells for generating electrical energy has also been described. Such cells take a variety of forms, but generally include a catalytic anode, an adjacent electrolyte which is in electrical contact with the anode, and a catalytic cathode, also adjacent the electrolyte and in electrical contact with it, but opposite the anode. When reactants are supplied to the two electrodes, for example hydrogen to the anode and oxygen to the cathode, electrical energy is generated between the two electrodes and a by-product, water, is formed.

If a fuel cell apparatus is utilized, but electrical energy is supplied to the electrodes, rather than being derived through the electrodes as a result of a reaction, dissociation of a gas adjacent one of the catalytic electrodes will occur. Utilizing the driving force of an applied potential and the permselective nature of an electrolye, e.g. an ion exchange membrane, such an ionic product may be caused to pass through the electrolyte to the opposite electrode where a molecular product is again formed. When an impure gas is fed to the first electrode of such a system, only one gas is ionized and passes through the electrolyte regenerating a pure gas at the opposite electrode.

It is, therefore, one object of this invention to provide a versatile, improved method of utilizing a fuel cell type of apparatus in gas treatment.

A further object of this invention is to utilize a fuel cell type of apparatus to purify a gas which is then employed as a reactant in a fuel cell used to generate current.

Briefly, this invention involves charging an impure gas into a fuel cell-type of apparatus comprising a catalytic anode, an electrolyte, and a catalytic cathode. Sufficient direct current energy is supplied between the electrodes to overcome the internal resistance of the cell, dissociate the gas to be treated, and drive the ionic form of the gas through the electrolyte for recovery at the opposite electrode. In a particular embodiment this process is used in conjunction with a fuel cell. An apparatus capable of performing the gas treatment is placed in a unitary structure with a fuel cell and is employed to generate a purified reactant for use in the fuel cell.

Several embodiments of the invention are illustrated in the accompanying drawing wherein.

Figure 3:
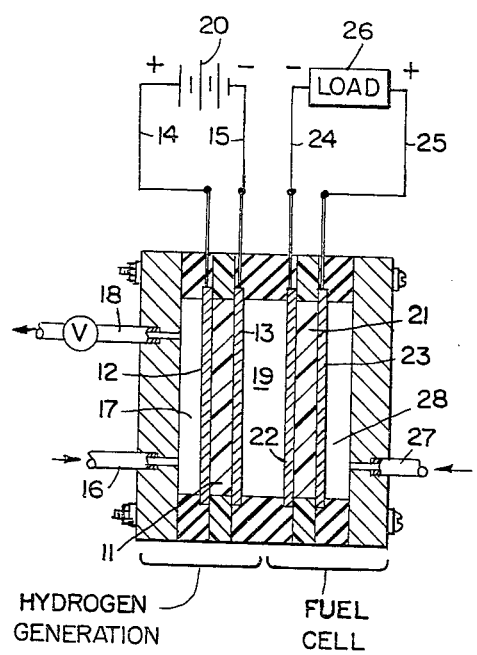
Figure 4:
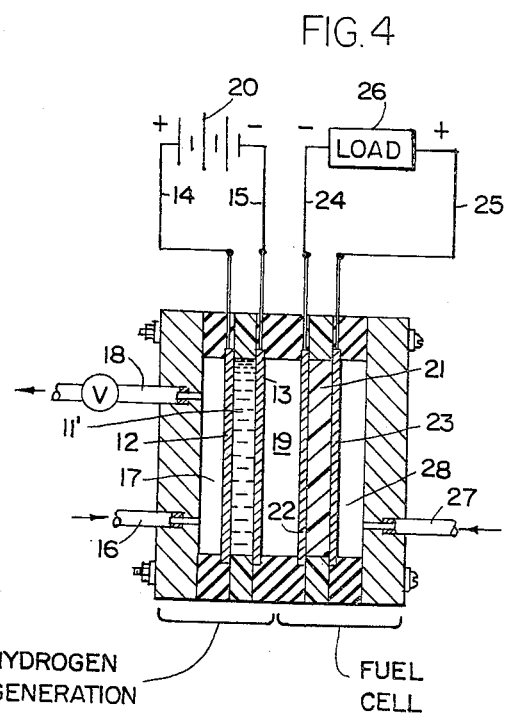

FIGURE 3 shows a unitary system utilizing the gas treatment apparatus of this invention in conjunction with an operating fuel cell where an ion exchange membrane is utilized as the electrolyte in the gas treatment portion of the apparatus; and FIGURE 4 represents the same combination as shown in FIGURE 3 where the electrolyte utilized in the gas treatment portion is an aqueous solution of an inorganic compound.

Figure 1:
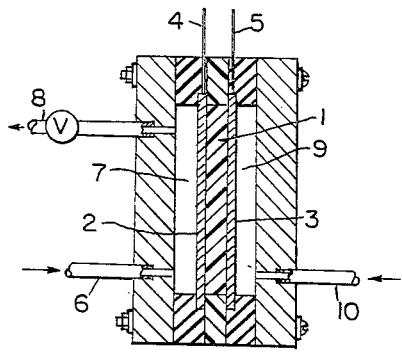
FIGURE 1 represents an apparatus which may be utilized for the gas treatment employing an ion exchange membrane as the electrolyte.

In FIGURE 1 a gas treatment cell employing a fuel cell-type apparatus is illustrated. The cell comprises an ion exchange membrane 1 positioned between and in electrical contact with catalytic electrodes 2 and 3. Membrane 1 is the sole electrolye in this gas treatment cell. Leads 4 and 5, connected to electrodes 2 and 3, respectively, are used to supply direct current energy from an external source, not shown. Impure gas to be purified is supplied to the electrode 2 through inlet 6 and chamber 7. A valved outlet 8 is provided from chamber 7 to exhaust any impurities or by-products from the gas stream being treated. The treated gas is removed from the apparatus by the chamber 9 and the outlet 10. Thus, a simple, versatile apparatus for treatment of a gas is provided wherein a gas may be supplied to the electrode 2, passed through the membrane 1, and released in its treated condition at the electrode 3 in the chamber 9.

Figure 2:
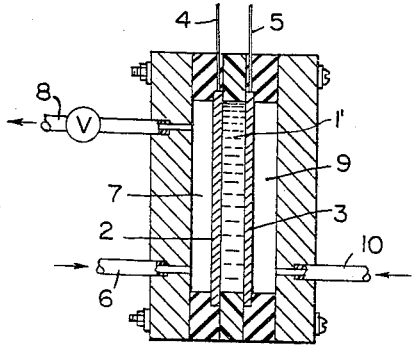
FIGURE 2 represents a similar gas treatment apparatus where the electrolyte is an aqueous solution of an inorganic compound.

The basic elements of the gas treatment cell of FIGURE 1 are also included in the cell illustrated in FIGURE 2. The exception is that in place of the ion exchange membrane 1 shown in FIGURE 1, an aqueous solution of an inorganic compound 1' acts as the electrolyte in this gas treatment cell.

A unitary structure including both a gas treatment portion and a standard fuel cell portion is shown in FIGURE 3. In this figure the gas treatment portion is adapted for hydrogen generation and employs an ion exchange membrane 11 positioned between and in electrical contact with a catalytic anode 12 and a catalytic cathode 13. The membrane 11 is the sole electrolyte in this portion of the cell. Leads 14 and 15, connected to the electrodes 12 and 13, respectively, are used to supply direct current energy from an external source 20. An impure hydrogen-containing gas is supplied to anode 12 through the inlet 16 and the chamber 17. A valved outlet 18 is provided from the chamber 17 to exhaust impurities or by-products from the hydrogen-containing gas being treated. The purified hydrogen is released from the cathode 13 into the chamber 19 for use in the fuel cell portion of the apparatus. It may be seen that the hydrogen treatment portion of this cell contains the same elements as the gas treatment cell illustrated in FIGURE 1 and described above. The elements 11–19 in the gas treatment portion of the unitary apparatus correspond to the elements 1–9 of the gas treatment cell illustrated in FIGURE 1.

A cationic ion exchange member 21 is shown for the fuel cell portion of the apparatus and is between and in electrical contact with a catalytic anode 22 and a catalytic cathode 23. These electrodes are connected by leads 24 and 25 to an external load designated at 26. An oxygen-containing gas, usually air or purified oxygen, enters the fuel cell portion of the apparatus through inlet 27 and is placed in contact with the cathode 23 via the chamber 28. Thus, it may be seen that impure hydrogen may be introduced at 16 to the hydrogen generation portion of the apparatus, exit in a purified condition through the chamber 19, and be used in conjunction with an oxygen-containing gas entering at 27 to generate current for utilization in an external load 26 attached to the fuel cell portion of the apparatus. It should be appreciated that while the figure is described with reference to hydrogen purification and utilization, by reversing the polarity on the electrodes, oxygen may be treated in a similar manner and a utilizable form of hydrogen supplied at 27; or further that the gas purification portion of the apparatus may be duplicated on the opposite side of the fuel cell and both hydrogen and oxygen treated for use in the fuel cell.

FIGURE 4 illustrates a unitary structure containing a gas treatment portion and a standard fuel cell portion as in FIGURE 3. The elements, with the exception of the electrolyte for the gas treatment portion of the cell are the same as those shown in FIGURE 3. The electrolyte in the gas treatment portion of this cell is designated 11' and consists of an aqueous solution of an inorganic compound. Thus, the gas treatment portion of the apparatus in FIGURE 4 contains the same elements as the gas treatment cell shown in FIGURE 2, elements 11' and 12 through 19 corresponding to elements 1' and 2 through 9.

As shown in the figures just described, either an ion exchange membrane or an aqueous solution of an inorganic compound may be employed as the electrolyte in the gas treatment cell of the present invention. With reference to the ion exchange material, it may consist of any of the well-known cation or anion exchange membranes. For example, cation exchange membranes formed of materials such as phenol aldehyde sulfonic acid, polystyrene-divinylbenzene sulfonic acid, and phenol aldehyde carboxylic acid may be employed. Among the anion exchange materials which may be utilized are quaternized chloromethylated polystyrene and aminated chloromethylated polystyrene.

The thickness of the membranes employed in the practice of this invention is not critical and may vary from several mils to a quarter of an inch or more. However, for economic reasons, the membranes are preferably as small as possible, for example, from about 2 to 30 mils.

The inorganic compounds which may be employed are those which form electrolytes when placed in water, and which have a low solubility for the gases involved in treatment. Examples of such inorganic compounds are bases, such as sodium hydroxide, potassium hydroxide, borax, trisodium phosphate, etc.; acids, such as hydrochloric acid, sulfuric acid, boric acid, etc.; and salts such as sodium chloride, silver nitrate, etc. It should be understood that the preferred aqueous inorganic electrolyte is one having a high electrical conductivity at a relatively low concentration. The high conductivity allows a conservation of electrical energy while the low concentration is less conductive to undesirable side effects.

A number of different types of electrodes are suitable for use in the cells of the present invention. Such electrodes should be conductors, should be capable of absorbing the gas to be treated, and should act as catalysts for the electrode reaction. Suitable electrodes which meet these requirements are well-known and many have been described in the literature. For example, a number of suitable electrodes are set forth in "Catalysis Inorganic and Organic," Berkman, Morrel, and Egloff, Reinhold Publishing Co., New York (1940). Suitable electrode materials include metals of Group VIII of the Periodic Table such as rhodium, palladium, iridium, and platinum. Other suitable metals include nickel and copper. In addition to these materials, the electrodes can be formed of platinum black or palladium black which is deposited on a base metal such as stainless steel, iron, nickel, and the like. In addition, suitable electrodes can be formed from metal oxides, or from carbon which is activated with platinum or palladium, or with oxides of iron, magnesium, cobalt, etc. These electrode materials may be used in sheet form, or in the form of screens, meshes, or other types of porous bodies. The thickness of the electrode is not critical, sizes of from 1 mil up to ¼ inch or more having been operated satisfactorily as electrodes. Additionally, the electrodes can be formed of asperitied alloys containing a noble metal, titanium, and a material such as tantalum.

The electrolyte materials mentioned in conjunction with the present invention have gas permeabilities on the order of $10^{-5}$ to $10^{-9}$ cc.-cm./sec.-atm.-cm.$^2$. The premeation rates may be appreciably improved by the application of a potential across the ionic barrier, that is between the electrodes adjacent and in electrical contact with the electrolyte, such as those designated 2 and 3 in FIGURE 1. The transfer rate of the gas is essentially proportional to the applied potential across the cathode and anode. In the case of the ion exchange membrane electrolytes this is true up to potentials at which the electrolyte would be dissociated. A portion of a gas composition, in the presence of impurities which will not contaminate the electrocatalyst, is transformed into ions which can migrate across the ionic conductor and form a molecular gas at the opposite electrode.

In the case of hydrogen, the dissociation and recombination reactions occur nearly reversibly, so that the energy requirements are very small. The transfer rate remains essentially proportional to the applied potential as previously mentioned. Treatment of hydrogen, as an example, is possible either from a gas composition which constitutes a physical mixture of hydrogen with other gases, or from a composition which comprises a chemical compound containing hydrogen which is susceptible to catalytic action to release the hydrogen.

The reactions involved in hydrogen treatment in the fuel cell-type of apparatus utilized in the present invention are as follows:

At the anode
$$H_2 \rightarrow 2H^+ + 2e^-$$

At the cathode
$$2H^+ + 2e^- \rightarrow H_2$$

With hydrogen gas treatment, using an ion exchange membrane as the electrolyte, it has been shown that overvoltages of the order of 10 millivolts can be associated with current densities of about 100 milliamperes per square centimeter. These overvoltages are identical for the cathodic, and anodic, reactions. Experimental measurements have shown hydrogen flow rates at or near the theoretical flow rate of 0.116 cc./sec.-amp. at 0° C. The hydrogen flow may proceed either from high pressure to low pressure, or from low pressure to high pressure. The latter has been experimentally demonstrated using pressure differences of as much as 350 mm. Hg.

When the fuel cell-type of apparatus is utilized for hydrogen treatment, a cost saving is realized through lower energy requirements. The total energy requirements can be represented by the formula:

$$E_T = E_a + E_c + IR_i$$

where $E_T$ is the total potential difference required, $E_a$ is the polarization potential of the anode, $E_c$ is the polarization potential of the cathode, I is the current, and $R_i$ is the internal resistance of the cell. It has been shown experimentally that for hydrogen $E_a = E_c$, so that $$E_T = E_e + IR_i$$

where $E_e$ is the polarization potential of both the anode and the cathode. It has been determined that about 0.080 volt is necessary for hydrogen transfer at a rate equivalent to 150 milliamps/cm.² As one ampere will cause the transport of 0.11 cc./sec., this is the same as a flow rate of 0.0174 cc./sec.-cm.² This corresponds to the very low power requirement of 53 kilowatt hours per 10,000 cubic feet and is the only power requirement of the treatment system. The efficiency of this technique is of course dependent upon possible internal energy losses, such as those which occur through the Joule effect, gas and ionic resistance to transport, etc.

When oxygen is the gas to be treated two different reactions may be utilized. For example, a cation exchange membrane may be utilized between the electrodes, in which case a hydrogen ion is conducted through the membrane from the oxygen-output side to the oxygen-input side, while water migrates through the electrolyte from the oxygen-input side to the oxygen-output side. The water conduction is by back diffusion, wicking, or another similar means. Here, the reactions are:

At the cathode
$$\tfrac{1}{2} O_2 + 2H^+ + 2e^- \rightarrow H_2O$$

At the anode
$$H_2O \rightarrow \tfrac{1}{2} O_2 + 2H^+ + 2e^-$$

There is an advantage in utilizing a cation exchange resin for the oxygen treatment process, in that the carbon dioxide picked up from the air is minimized. However, as water does not diffuse rapidly enough from the oxygen-input side to the oxygen-output side, an additional water supply would be required.

If an anion exchange resin is utilized for the oxygen treatment, hydroxyl radicals are the transported material. The reactions are then as follows:

At the cathode
$$O_2 + 2H_2O + 4e^- \rightarrow 4OH^-$$

At the anode
$$4OH^- \rightarrow O_2 + 2H_2O + 4e^-$$

The following examples are shown by way of illustration of the use of a fuel cell-type of apparatus for gas treatment. They should not be considered as limiting in any way.

EXAMPLE I

A cell was assembled utilizing electrodes formed of a powdered mixture of nickel, platinum, and palladium, in a ratio of 5:1:1, contained in 10% polytetrafluoroethylene. Two electrodes, of identical composition, and each having an area of 10 cm.² were separated by ⅛ inch of 40% potassium hydroxide. Air was passed over one side, a current generated between the electrodes, and oxygen collected at the opposite electrode. The following electrical measurements were made at 25° C.:

| Potential, volts | Current, amperes |
|---|---|
| 0.70 | 0.20 |
| 0.80 | 0.48 |
| 0.91 | 0.71 |
| 1.02 | 0.99 |

A measurement of the gas generated was made at a current of 0.97 amps. In two minutes, 7.5 cc. of oxygen were collected over water at a pressure of 750 mm. Hg. This is the equivalent of 3.2 cc. of oxygen at standard temperature and pressure per minutes, as corrected for the gas pressure, the vapor pressure of water, and the pressure differential between the inside and outside water levels in the collection apparatus. This compares to the theoretical oxygen transport rate of 3.48 cc./amp.-min. at 1 atm. and 0° C. However, the performance of the cell gradually decreased over a 2-hour period to give an amperage of 0.05 at 1.5 volts. This probably resulted from the use of dry air as crystals, which appear to be carbonates, appeared on the face of the electrode. Flushing of the electrolyte with water partially restored the initial performance. Very little gas was observed on the electrolyte side of the oxygen-output electrode.

EXAMPLE II

A cell was assembled utilizing platinum black electrodes having a working area of 45.5 cm.² Between the electrodes was a phenol-aldehyde sulfonic acid membrane having a thickness of about 12 mils. A gas containing hydrogen at a temperature of 25° C. and a pressure of 1105 mm. Hg was passed over one electrode while a voltage was applied between the electrodes. Purified hydrogen gas, also at 1105 mm. Hg and 25° C. was collected at the opposite electrode. The cell resistance was determined to be 0.36 ohm. The following data were obtained.

| Applied Potential, volts | Current, amps. | Hydrogen Flow Rate, cc./sec.-amp. |
|---|---|---|
| 0.475 | 1.3 | 0.092 |
| 0.655 | 1.8 | 0.089 |
| 0.812 | 2.2 | 0.091 |
| 0.925 | 2.5 | 0.092 |
| 1.091 | 2.9 | 0.095 |
| 1.180 | 3.3 | 0.091 |
| 1.270 | 3.6 | 0.091 |

Thus, the average hydrogen flow rate was 0.091 at 1105 mm. Hg and 25° C. which is the equivalent of 0.177 cc./sec.-amp. at standard temperature and pressure. This is the same as the theoretical transfer rate, within experimental error.

EXAMPLE III

A cell identical to that described in Example II was utilized for oxygen gas treatment. The oxygen was supplied to one electrode at a pressure of 768 mm. Hg and a temperature of 22° C., and removed from the opposite electrode under the same conditions. The following data were measured during the operation of the cell:

| Applied potential, volts | Current, amps. | Oxygen Flow Rate, cc./sec.-amp. |
|---|---|---|
| 0.63 | 0.11 | 0 |
| 0.68 | 0.16 | 0 |
| 0.78 | 0.27 | 0 |
| 0.85 | 0.40 | 0.059 |
| 1.09 | 0.48 | 0.058 |

The oxygen flow rate, corrected for standard temperature and pressure, was 0.056 cc./sec.-amp. This compares with the theoretical flow rate of 0.0563, or is the same, within experimental error.

EXAMPLE IV

To demonstrate that the conduction of gas through the electrolyte of the present gas treatment cell is by ionic transfer, and not by the previous permeation-diffusion techniques, a cell, identical to that utilized in Examples II and III was set up for use with nitrogen. The potential applied across the electrodes was gradually increased up to 1.4 volts, at which point electrolysis of the membrane occurred. At no time had there been a flow of gas between the electrodes.

EXAMPLE V

Work was done on optimum electrode configuration and membrane sizing. A single hydrogen electrode with a hydrogen-platinum counterelectrode were utilized. A polystyrene sulfonic acid membrane with a platinum black catalyst was placed between the electrodes which had an area of 3.88 cm.$^2$. The anodic hydrogen oxidation and the cathodic hydrogen evolution were measured potentiostatically. The polarizations were found to be linearly proportional to current densities, the slope of the curve being 0.126 volt/amp./cm.$^2$, or 0.019 volt at a measured current density of 150 milliamps/cm.$^2$. Thus, it is apparent that the applied voltage for a defined transport rate may be much smaller than that reported in Example II, when optimum conditions are utilized.

While the process and apparatus have been described for use in providing a pure gas through ionic conduction in an electrolyte, they may also be used for other gas treatments. For example, the apparatus and process may be utilized in transferring a gas from a gas-rich composition to a gas-dilute composition so as to provide a mixture having a particular percentage of the transported gas. Similarly, the process and system may be used in transporting a desired gas from a gas-dilute composition to a gas-rich composition to obtain a desired percentage of the gas in the final composition. Since it is possible for the gas at the outlet side of the system to be at a pressure higher than that at the inlet side, the process and apparatus utilized in the present invention may be employed to compress the treated gas. The amount of compression which is possible is limited only by the potential which may be applied without causing membrane electrolysis and by the pressure gradient which the particular membrane will allow.

Further, the apparatus may be utilized in aiding a reaction which is dependent upon the percentage of a particular gas present in the reaction mixture. Thus, if the removal of the gas from the reaction will accelerate the reaction, the ionic transfer process utilizing the fuel cell-type of apparatus may be utilized to carry that gas away from the reaction mixture.

Of particular interest is the use of the apparatus in preparing fuels for use in a fuel cell, as mentioned previously. In this application the treatment apparatus could, for example, produce hydrogen from an organic compound, the hydrogen being introduced directly to the anode of the fuel cell for use in current generation. Such a system could also be utilized for oxygen by deriving a purified form of oxygen from air or any other common mixture. The system could be mounted in a unitary structure holding both the gas purification and fuel cell elements, as shown in FIGURES 3 and 4. Whether purification means were provided for one or both sides would depend upon the fuel supply available at the place where the cell was to be utilized.

In some cases an external power supply would not be necessary, particularly where the pressure difference from the gas-input side to the gas-output side could be made great enough to overcome the small overvoltage required, and give a reasonable transfer rate. The electrodes could then be shorted together to get selective transfer without the use of an external source of electric power. This phenomenon will occur when the conditions described by the following equations are met:

The attainment of selective transfer utilizing the apparatus of this invention is dependent upon the relationship established by the ideal gas law, which is applicable at the temperatures utilized in the present invention. Thus, $E$, the theoretical potential difference between the two electrodes, is represented by the formula $$E = 0.059 \log \cdot p_1/p_2$$

where $p_1$ is the partial pressure of hydrogen in the input gas stream and $p_2$ is the partial pressure of hydrogen in the treated gas stream. These quantities may be further represented by the following equations:

$$p_1 = x_1 P_1$$

and $$p_2 = x_2 P_2$$

where the $x$'s represent the mol fraction of hydrogen in the mixture and the $P$'s represent the total pressure of the gas mixture. When purified hydrogen is to be produced, $x_2$ is about 1.0, so that the equation becomes $E = 0.059 \log \cdot (x_1 P_1/P_2)$. If $P_1$ were 20 atmospheres and $P_2$ one atmosphere, with the mol ratio of hydrogen in the input gas stream at 0.5, $E$ would be 0.059 volt. This voltage, if the electrodes were shorted, would be utilizable as a driving force for the gas transfer and would allow hydrogen transport at a rate equivalent to about 100 milliamps/cm.$^2$, a measurement experimentally obtained. Operation in this fashion is essentially equivalent to the diffusion process utilizing a platinum membrane, and does not provide all the advantages found when utilizing a fuel cell-type of apparatus with an applied potential. Hydrogen transfer, however, has been observed utilizing an apparatus of the type just described.

While specific embodiments of the invention have been shown and described, the invention should not be limited to the particular examples shown. It is intended, therefore, by the appended claims, to cover all modifications within the spirit and scope of this invention.

What I claim as new and desire to secure by Letters Patent of the United States is:

1. A process of obtaining relatively pure oxygen comprising
   bringing an oxygen containing gas stream into contact with a catalytically active cathode ionically conductively associated with a catalytically active anode through a polymeric cation exchange electrolyte,
   establishing an electrical potential between the electrodes,
   reacting hydrogen ions from the polymeric cation exchange electrolyte with oxygen at the cathode to produce water, and
   dissociating water into hydrogen ions and oxygen at the anode.

2. A process of obtaining relatively pure oxygen comprising
   bringing an oxygen containing gas stream into contact with a catalytically active cathode ionically conductively associated with a catalytically active anode through a polymeric anion exchange electrolyte, establishing an electrical potential between the electrodes, reacting water associated with the polymeric anion exchange electrolyte with oxygen at the cathode to produce hydroxyl ions, reacting hydroxyl ions at the catalytically active anode to produce oxygen and water.

3. A process of obtaining relatively pure hydrogen comprising bringing a hydrogen containing gas stream into contact with a catalytically active anode ionically conductively associated with a catalytically active cathode through a polymeric anion exchange electrolyte, establishing an electrical potential between the electrodes, reacting hydrogen from the gas stream with water at the anode to produce hydroxyl ions, and reacting hydroxyl ions at the catalytically active cathode to produce hydrogen gas and water.

4. A process of obtaining relatively pure hydrogen comprising bringing a hydrogen containing gas stream into contact with a catalytically active anode ionically conductively associated with a catalytically active cathode through a polymeric cation exchange electrolyte.

establishing an electrical potential between the electrodes, converting hydrogen from the gas stream to hydrogen ions at the anode, and converting hydrogen ions from the polymeric cation exchange electrolyte to hydrogen gas at the cathode.

5. A process of obtaining relatively pure oxygen comprising bringing an oxygen containing gas stream into contact with a catalytically active cathode ionically conductively associated with a catalytically active anode through a polymeric cation exchange electrolyte.

establishing an electrical potential between the electrodes, reacting hydrogen ions from the cation exchange electrolyte with oxygen at the cathode to produce water, dissociating water into oxygen and hydrogen ions at the anode faster than water can diffuse to the anode from the cathode through the polymeric cation exchange electrolyte, and supplying water to the anode to replace the water which is dissociated.

6. A process of obtaining relatively pure hydrogen comprising bringing a hydrogen containing gas stream into contact with a catalytically active anode ionically conductively associated with a catalytically active cathode through a polymeric anion exchange electrolyte, establishing an electrical potential between the electrodes, reacting hydroxyl ions at the catalytically active cathode to produce hydrogen gas and water, reacting hydrogen from the gas stream with water at the anode to produce hydroxyl ions at a faster rate than water can diffuse to the anode from the cathode through the polymeric anion exchange electrolyte, and supplying water to the anode to replace the water which is reacted.

7. A process of obtaining relatively pure hydrogen from a hydrogen containing compound susceptible to catalytic action to release hydrogen comprising bringing the hydrogen containing compound into contact with a first fuel cell electrode ionically conductively associated with a catalytically active second, counter electrode through a polymeric ion exchange electrolyte, establishing an electrical potential between the electrodes, and recovering hydrogen gas in a relatively pure form from the counter electrode.

References Cited

UNITED STATES PATENTS

| | | |
|---|---|---|
| 3,085,053 | 4/1963 | Taylor. |
| 2,384,463 | 9/1945 | Gunn et al. _____ 136—86 |
| 3,103,473 | 9/1963 | Juda _____ 204—77 |
| 3,124,520 | 3/1964 | Juda _____ 204—86 |
| 3,134,697 | 5/1964 | Niedrach _____ 136—86 |
| 3,180,813 | 4/1965 | Wasp et al. _____ 204—129 |
| 3,220,937 | 11/1965 | Friese et al. _____ 204—1 |

FOREIGN PATENTS 303,027  10/1929  Great Britain.

JOHN H. MACK, Primary Examiner

HOWARD M. FLOURNOY, Assistant Examiner

U.S. Cl. X.R.

136—86

// REEXAMINATION CERTIFICATE (427th)

United States Patent
Maget

[11] B1 3,489,670
[45] Certificate Issued  Dec. 10, 1985

[54] PROCESS FOR GAS PURIFICATION

[75] Inventor: Henri J. R. Maget, Swampscott, Mass.

[73] Assignee: General Electric Company

Reexamination Request:
No. 90/000,722, Feb. 8, 1985

Reexamination Certificate for:
Patent No.: 3,489,670
Issued: Jan. 13, 1970
Appl. No.: 385,925
Filed: Jul. 29, 1964

[51] Int. Cl.$^4$ .............................................. C25B 1/04
[52] U.S. Cl. ...................................... 204/129; 429/41
[58] Field of Search .............. 204/129, 263, 265, 266, 204/277, 278; 429/41

[56] References Cited
FOREIGN PATENT DOCUMENTS
15544 of 1983 Japan .................................. 204/129

OTHER PUBLICATIONS

Stanley H. Langer & Robert G. Haldeman, *The Journal of Physical Chemistry*, vol. 68, No. 4, Apr. (1964).
A. G. Winger, R. Ferguson & R. Kunin, *Journal of Physical Chemistry*, 60,556 (1956).
L. W. Niedrach & W. T. Grubb, *Chemical Technology*, "A Series of Monographs"-vol. 1, Fuel Cells, Academic Press P 263 (1963).
Stanley H. Langer & Robert G. Haldeman, *Science*, vol. 142, No. 3589, Oct. 11, (1963).
James S. Bone, *Proceedings 14th Annual Power Sources Conference*, May 17-18-19, (1960).

*Primary Examiner*—Andrew H. Metz
*Assistant Examiner*—Terryence Chapman

[57] ABSTRACT

Hydrogen or oxygen is supplied to one fuel cell electrode mixed with other gases or in chemical combination with other elements. A potential difference is induced between the one electrode and a counter electrode of the fuel cell separated by a polymeric ion exchange electrolyte to generate pure hydrogen or oxygen at the counter electrode. The hydrogen or oxygen may be generated by decomposition of water or may be transported through the electrolyte in ionic form, depending upon whether a polymeric cation or anion exchange electrolyte is employed.

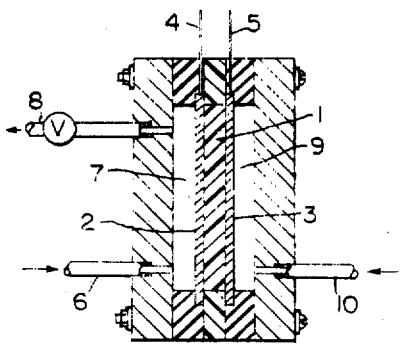

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3 and 5–7 is confirmed.

Claims 1, 2 and 4 are cancelled.

* * * * *